United States Patent
Uusitalo et al.

(10) Patent No.: US 7,382,881 B2
(45) Date of Patent: Jun. 3, 2008

(54) LAWFUL INTERCEPTION OF END-TO-END ENCRYPTED DATA TRAFFIC

(75) Inventors: Ilkka Uusitalo, Oulu (FI); Pasi Ahonen, Oulu (FI); Rolf Blom, Järfälla (SE); Boman Krister, Mölndal (SE); Mats Näslund, Vällingby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 638 days.

(21) Appl. No.: 10/497,568

(22) PCT Filed: Dec. 6, 2002

(86) PCT No.: PCT/EP02/14080

§ 371 (c)(1),
(2), (4) Date: Nov. 5, 2004

(87) PCT Pub. No.: WO03/049357

PCT Pub. Date: Jun. 12, 2003

(65) Prior Publication Data

US 2005/0063544 A1   Mar. 24, 2005

(30) Foreign Application Priority Data

Dec. 7, 2001  (GB) ................................. 0129339.8
Dec. 18, 2001 (SE) ................................... 0104283

(51) Int. Cl.
*H04L 9/00* (2006.01)
(52) U.S. Cl. .................. 380/262; 380/44; 380/281; 713/171
(58) Field of Classification Search ............... 713/168, 713/171; 380/44, 262, 281, 277, 284
See application file for complete search history.

(56) References Cited

U.S. PATENT DOCUMENTS

| | | | |
|---|---|---|---|
| 5,850,451 A | 12/1998 | Sudia | |
| 6,178,505 B1 * | 1/2001 | Schneider et al. | 713/168 |
| 6,225,888 B1 * | 5/2001 | Juopperi | 340/5.8 |
| 6,628,786 B1 * | 9/2003 | Dole | 380/44 |

OTHER PUBLICATIONS

J. Arkko, et al., "MIKEY: Multimedia Internet KEYing <draft-ietf-msec-mikey-00.txt>" Internet Engeneering Task Force (IETF) Draft, Nov. 2001, p. 1-37 XP002202866, the whole document.
European Patent Office, International Search Report for PCT/EP02/14080 dated Jun. 17, 2003.

* cited by examiner

*Primary Examiner*—Hosuk Song

(57) ABSTRACT

A method of facilitating the lawful interception of an IP session between two or more terminals 12,13, wherein session uses encryption to secure traffic. The method includes storing a key allocated to at least one of terminals 12,13 or to at least one of the subscribers using one of the terminals 12,13, at the terminal 12,13 and at a node 5,8 within a network 1,6 through which session is conducted, or a node coupled to that network. Prior to the creation of session, a seed value is exchanged between the terminal 12,13 at which the key is stored and node 5,8. The key and the seed value are used at both the terminal 12,13 and the node 5,8 to generate a pre-master key. The pre-master key becomes known to each of the terminals 12,13 involved in the IP session and to the network node 5,8. The pre-master key is used, directly or indirectly, to encrypt and decrypt traffic associated with IP session.

38 Claims, 7 Drawing Sheets

LAWFUL INTERCEPTION OF END-TO-END ENCRYPTED DATA TRAFFIC

FIELD OF THE INVENTION

The present invention relates to a method and apparatus for facilitating lawful interception of Data traffic, for example IP traffic.

BACKGROUND TO THE INVENTION

It is now possible to establish various forms of connection over the Internet including data connections as well as voice and video telephony connections. As the speed and extent of the Internet increases, the use of voice and video telephony can be expected to grow. Whilst current technology tends to restrict IP multimedia sessions to computer terminals coupled to the Internet, tomorrow's technology will provide for IP multimedia sessions between small dedicated telephony terminals, and other mobile devices such as PDAs, palmtop computers etc.

In order to allow such devices to gain widespread acceptance, a key issue which must be addressed is that of security. The two main security concerns are the avoidance of unauthorised eavesdropping, and the need to authenticate terminals involved in a communication (i.e. to ensure that the terminal which a "subscriber" connects to is the terminal which the subscriber intends to connect to and vice versa). However, these concerns are not unique to IP multimedia, and are common to many different forms of IP communication. Several protocols exist for securing data traffic using encryption and/or authentication.

One such security protocol is known as IPsec (IETF RFC2401). In order to allow IPsec packets to be properly encapsulated and decapsulated it is necessary to associate security services and a key between the traffic being transmitted and the remote node which is the intended recipient of the traffic. The construct used for this purpose is a "Security Association" (SA). A second security protocol is known as SRTP (Secure Real-Time Protocol)—see draft-ietf-avt-srtp-02.txt. It is expected that the third generation mobile network architecture known as 3GPP will adopt SRTP as the protocol for securing IP Multimedia traffic. Of course, other protocols such as IPsec may be used in other mobile network architectures.

In the Internet draft "draft-ietf-msec-mikey-00.txt", a key management scheme known as Multimedia Internet KEYing (MIKEY) is described for use in real-time applications. The scheme provides for the creation of a Security Association (SA) and the distribution of a Pre-Master Key (PMK). (Actually, MIKEY denotes these keys "TEK Generating Keys", but PMK is a more common term and will be used throughout as the invention's use is not restricted to MIKEY.) The PMK is used to derive a Traffic-Encrypting Key (TEK) for each crypto session. More specifically, the TEK is used as the key input to the chosen security protocol, i.e. SRTP.

SUMMARY OF THE INVENTION

Traditional circuit switched telephone networks make provision for the lawful interception of telephone calls. Such interception must be instigated by the appropriate authorities and is an important weapon against fraud and other crimes. Understandably, it is desirable to make provision for the lawful interception of IP sessions (whether pure data, VoIP, video, etc). However, this presents a potential problem as the IP security protocols which will be used have been designed to provide terminal-to-terminal security involving strong encryption.

If the a protocol such as the MIKEY proposal is implemented, security mechanisms will rely upon the use of a Pre-Master Key (PMK) which is agreed upon by the parties to an IP session. The PMK may be proposed by the initiator of the session and accepted (or rejected) by the responder, or may be generated using values exchanged between the parties to the session. The agreement of the PMK forms part of an IP Multi-Media key management function. Following the agreement of the PMK, the Multi-Media key management function may encrypt the PMK with a secret key which it shares with the responder, or with the public key of the responder, or the initiator may calculate a Diffie-Hellman modular exponentiation to obtain the PMK. It will be appreciated that in order to intercept traffic associated with that session, a third party must have knowledge of the PMK It is an object of the present invention to facilitate the lawful interception of an IP session which requires the parties involved in the session to agree upon a PMK for use in securing traffic sent over the session.

According to a first aspect of the invention there is provided a method of facilitating the lawful interception of a data session between two or more terminals, wherein said session uses encryption to secure traffic, the method comprising:

storing a key allocated to at least one of said terminals, at the terminal and at a node within a network through which said session is conducted or at a node coupled to that network;

prior to setting up a session between the terminals, exchanging a seed value between the terminal at which the key is stored and said node;

using the key and the seed value at the terminal to generate a pre-master key, wherein the pre-master key also becomes known to the or each other terminal involved in the data session; and directly or indirectly using said pre-master key to encrypt and decrypt traffic associated with said session.

According to a second aspect of the invention there is provided a method of securing data transmitted between a plurality of terminals, each of which is attached to a communications network, at least one of the terminals having allocated to it a home network, the method comprising:

sending a seed value from the home network to the at least one terminal, via the corresponding communications network, as part of a call signalling level authentication procedure; and using said seed value at the at least one terminal to generate one or more traffic encryption keys for use in the end-to-end encryption of traffic associated with a call between terminals.

This method preferably comprises storing a secret key at said mobile terminal and in the home network, and sending that key from the home network to said mobile network for use in said authentication procedure, the key also being used by the wireless terminal to generate said traffic encryption key(s). The step of generating one or more traffic encryption keys comprises performing a key exchange procedure between the terminals.

Preferably, the Session Initiation Protocol is used to setup and control calls between terminals, and the method comprises sending said random value from said home network to the mobile terminal, via a P-CSCF node of said mobile network. More preferably, said call signalling level authentication procedure is an IMS AKA procedure.

Preferably, the method further comprises forwarding said random value to a lawful interception authority to allow that authority to compute the traffic encryption key(s), whereby when a call is setup encrypted traffic can be forwarded to the authority for decryption.

Further aspects and preferred features of the invention are set out in the attached claims.

DETAILED DESCRIPTION OF PREFERRED EMBODIMENTS

Figure 1:
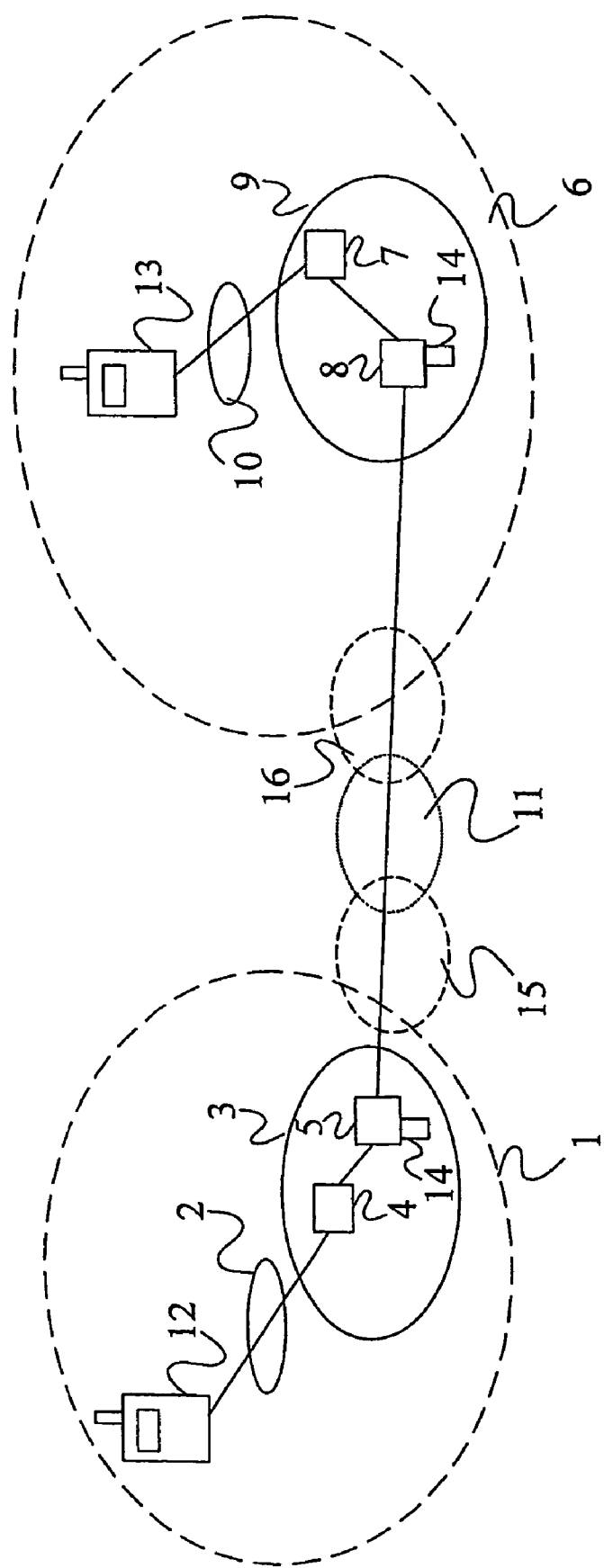
FIG. 1 illustrates schematically a communications network for enabling an IP session to be established between two mobile terminals.

There is illustrated in FIG. 1 a communications system comprising a mobile telecommunications network 1 which for the purpose of this discussion is assumed to be a 3GPP (or UMTS) network. Within the 3GPP network 1 are a UMTS Terrestrial Radio Access Network (UTRAN) 2 and a GPRS network 3. The GPRS network comprises one or more Serving GPRS Support nodes (SGSNs) 4 and one or more Gateway GPRS Support Nodes (GGSNs) 5. The role of the SGSN 4 is to maintain subscription data (identities and addresses) and to track the location of user equipment (UB) within the network. The role of the GGSN 5 is to maintain subscription information and allocated IP addresses and to track the SGSN 4 to which UEs are attached. The network 1 also contains subscriber databases, e.g. HSS or AuC/HLR 14, maintaining subscription information about users, keying information for security etc.

FIG. 1 also illustrates a second mobile telecommunications network 6 which is also assumed to be a 3GPP network. This network also comprises SGSNs 7 and GGSNs 8 forming part of a GPRS network 9, and a UTRAN 10. The two GGSNs 5,8 are both coupled to an IP network 11. Two UEs 12,13 are attached to the first and second networks 1,6 respectively. 3GPP provides UEs with an "always connected" service such that as long as UEs are registered with a network (home or visited) they are allocated IP addresses and can receive and send data without the need for a connection to be established. A call set-up protocol, e.g. the Session Initiation Protocol (SIP), may be used to establish a multimedia session between the two UBs 12,13 of FIG. 1. (SIP will be described in more detail later. Here it is only noted that SIP can be used to set up sessions by "inviting" other users to join sessions.) Within the GPRS networks 3,9 it is the GGSNs 5,8 which implement the policy of the network operator, e.g. which subscribers can access which services, subscriber priorities, etc.

Typically, when a subscriber registers with the operator of a 3GPP network, he or she receives a Subscriber Identity Module (SIM) card on which is stored a unique International Mobile Subscriber Identity (IMSI) code. In addition to the IMSI it is proposed here that a secret key k is also stored on the SIM card. This key is known only to the network operator and to the user (or rather to the user's SIM card) and a copy of the key is stored in a Subscriber Database (SDB) 14 attached to for example the HSS or HLR/AuC of the subscriber's home network. Also stored on the subscriber's SIM card (or possibly in a memory of the subscriber's UE) and in the SDB 14 is a pseudo-random function such as a keyed hash (or MAC, Message Authentication Code) such as SHA-1 or MD5 or the 3GPP Milenage algorithm (see 3GPP TS 35.205-35.209 for the latter).

For the reasons set out above, it may be necessary to intercept an IP session between the two UEs 12,13. Interception is carried out as follows.

Assume that a session is initiated by a first of the UEs 12. The UE 12 sends an invite message via the GGSN 5 to which it is attached. The invite message identifies both the initiating UE 12 and the responding UE; in this case UE 13. At this stage, the session initiation is placed on hold, and the database 14 is inspected to see if it holds a key for the initiating UE 12. If no key is contained in the database 14, the session initiation is not allowed to continue and a notification message may be returned to the UE 12. If on the other hand a key is held for the UE 12, the SDB 14 generates a random number or "nonce" and returns this to the UE 12 via the GGSN 5. The nonce provides a seed value for further computations. The nonce need not be secured (i.e. encrypted) for transmission to the UE 12. Both the UE 12 and the SDB 14 then compute a Pre-Master Key (PMK), k_m, by applying the pseudo-random function to the shared key and the nonce, i.e.

$$k\_m = PRF(k, nonce).$$

Once the PMK has been established, the GGSN 5 routes the invite message to the home network 6 of the responding UE 13 via an "IP Multimedia Subsystems" 15,16 (operated respectively by the operators of the mobile networks 1,6). The invite message is received by the responding UE 13 via the GGSN 8 to which it is connected. Assuming that the responding UE 13 chooses to accept the session setup request, phase 1 of a key exchange protocol, e.g. MIKEY, is initiated. This requires that the UE 12 send to the UE 13 the PMK which has been established by the UE 12 in conjunction with the SDB 14. The PMK may be encrypted with a secret key shared between the UEs 12,13 or with the public key of the responding UE 13 (SRTP does not specify how the PMK should be exchanged or negotiated, it only requires that a common, secret PMK must be known to the parties, e.g. by means of using MIKEY). In either case, the result is that the UEs 12,13 and the SDB 14 to which the originating UE 12 is attached, all know the PMK at the end of phase 1.

In phase 2 of the key exchange protocol, the UEs 12,13 use the shared PMK to generate a Traffic-Encrypting Key (TEK). The procedure involved is set out in the MIKEY draft referred to above. As the algorithm and parameters (including the PMK) required to calculate the TEK are known to the SDB 14, the SDB can compute the TEK. Once the TEK is generated, the IP session can begin. Traffic is encrypted and decrypted, using e.g. SRTP, at the UEs 12,13 using the TEK. In some cases, a pair of TEKs may be generated in phase 2 of the key exchange protocol, with a first of the TEKs being used to encrypt traffic in one direction and the second TEK being used to encrypt traffic in the opposite direction.

It will be appreciated that IP traffic associated with the session will always pass through the GGSN 5. As such, the GGSN 5 is able to intercept the traffic and, if given the keys from the SDB 14, decrypt it using the TEK(s). The decrypted traffic can then be passed to a government authority such as the police. Alternatively, during the session setup phase, the network operator may forward the TEK(s) to the government authority. Traffic which is intercepted at the GGSN 5 is therefore passed directly to the government authority which can decrypt the traffic using the previously received TEK(s).

Figure 2:
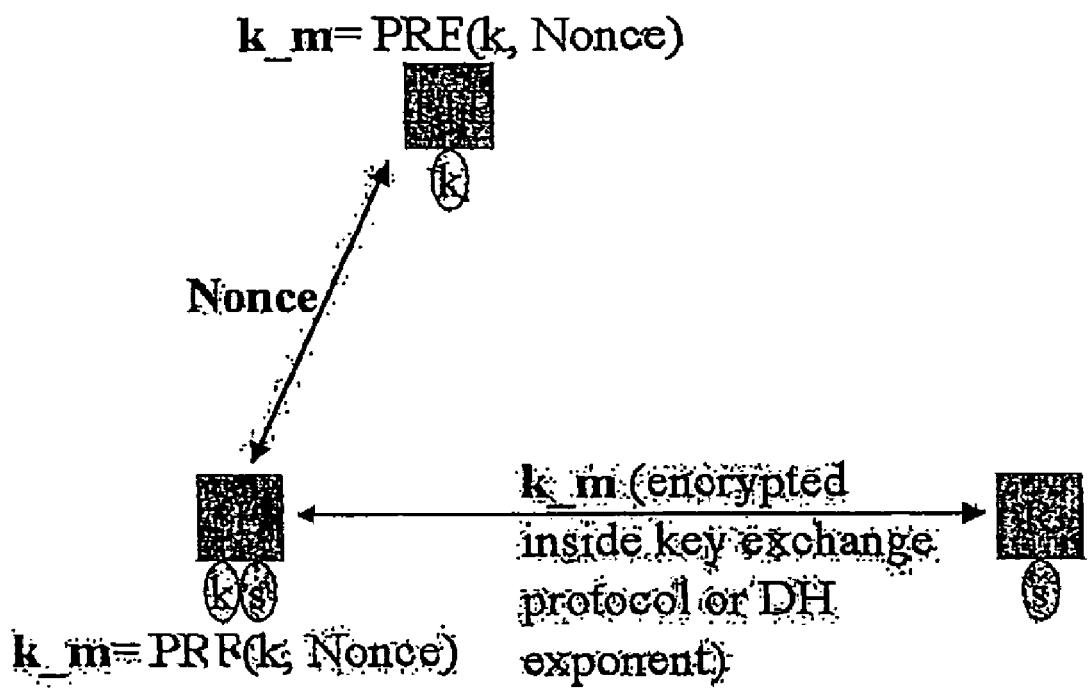
FIG. 2 shows signalling exchanged between the mobile terminals of FIG. 1 and a network node, the signalling being associated with the establishment of a shared secret.
Figure 3:
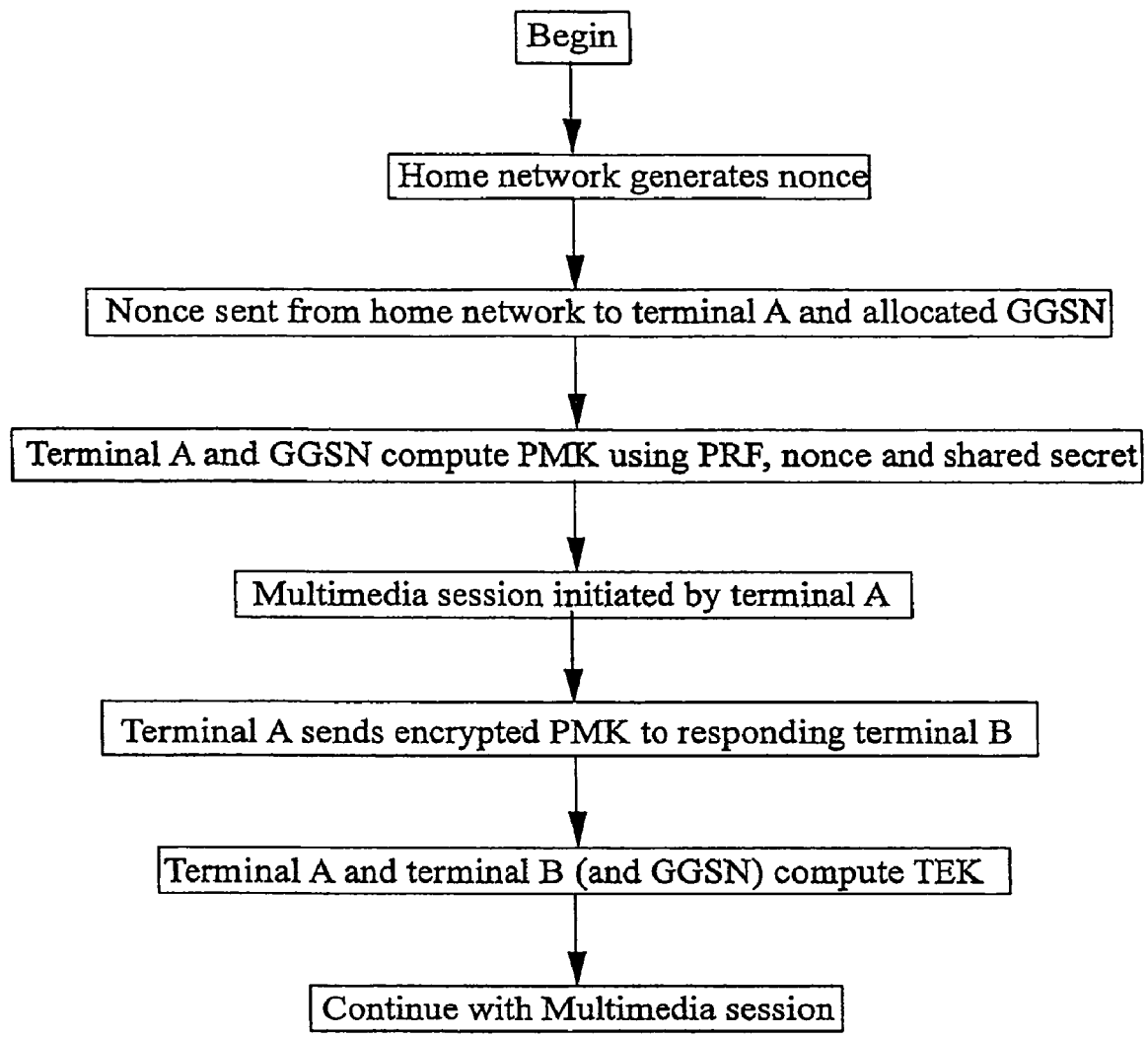
FIG. 3 is a flow diagram illustrating a method of intercepting an IP session.

The signalling associated with the PMK generation and exchange phase is illustrated in FIG. 2. FIG. 3 is a flow diagram further illustrating the mechanism. It will be appreciated that the GGSN will only be given the TEK if lawful interception is authorised for the IP session.

Agreements may be made between governments and network operators to enable a government authority to intercept an IP session initiated by a UE outside the authority of an interested government. In this case, a PMK generated at a node of an external network may be sent from the external network to the network under the authority of the interested government. The PMK can then be used to intercept the IP session.

Whilst the above description has been concerned with UEs and mobile networks, the present invention is not to be considered limited to mobile networks. The invention is also applicable to IP sessions extending between terminals coupled to fixed line networks and to other wireless networks, and to IP sessions extending between terminals coupled to different network types (e.g. a mobile to fixed line terminal session). The invention may be applied to UEs connected to the same access network as well as to different access networks.

In a modification to the procedure described above, rather than using a pseudo-random function to generate the PMK from the nonce and the shared secret key, an encryption function such as Data Encryption Standard (DES) or Advanced Encryption Standard (AES) may be used. In another modification, rather than using the entire shared secret key k to generate the PMK, only a portion or modified version of the shared secret key may be used. In yet another modification, the TEK(s) is (are) derived from the PMK via one or more intermediate encryption keys.

It will be appreciated by the person of skill in the art that various modifications may be made to the above described embodiment without departing from the scope of the present invention. For example, rather than the initiating UE generating the PMK, the PMK may be generated using a Diffie-Hellman exchange between the participating UEs.

Let (G,*) be a commutative group. For a natural number x, and g in G, let $$g\hat{}x = g*g* \ldots *g$$

Figure 4:
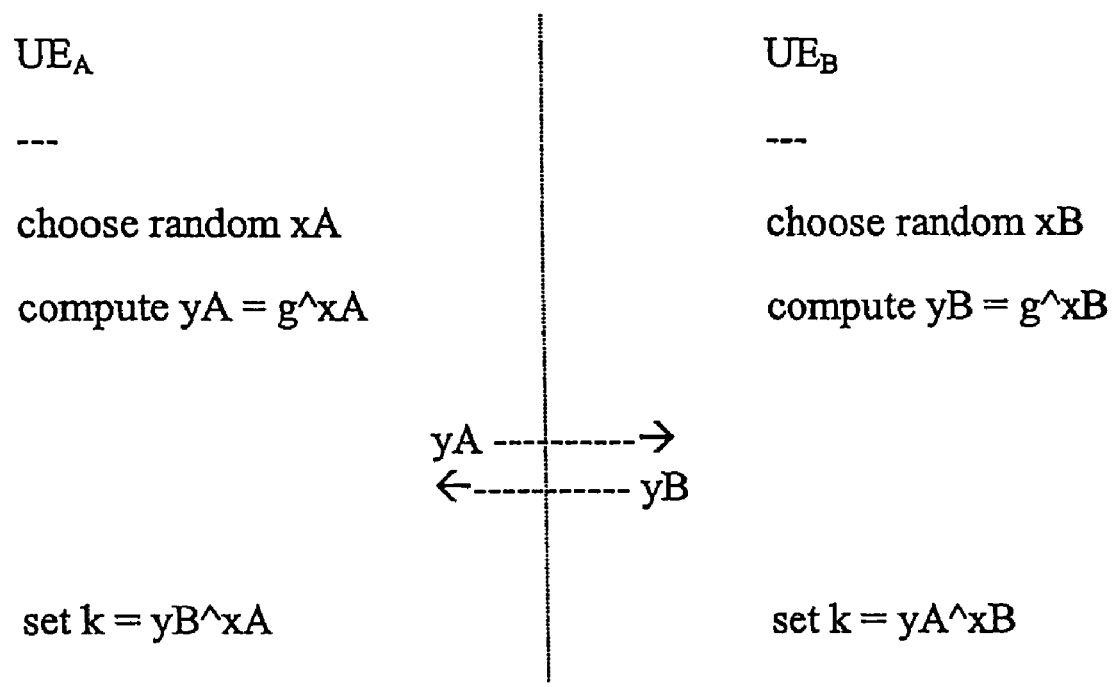
FIG. 4 illustrates signalling associated with a Diffie-Hellman exchange.

(x times). Consider the problem of computing $y=g\hat{}x$, given g and x. By a "binary" method, this can be done using $\log\_2(x)$ group operations ("multiplications" and "squarings"). Now consider the inverse problem, given y $(=g\hat{}x)$ and g, find x. This is known as the (discrete) logarithm problem. If the group (G,*) comprises real numbers under multiplication, then the logarithm is almost as easy to compute as $g\hat{}x$ itself. However, in some cases, e.g. when (G,*) is 1. the integers under multiplication modulo a suitable prime number, p
2. points on a suitable elliptic curve under addition, there exists no known, efficient algorithm for the logarithm problem (the best general method has a running time proportional to roughly $|G|\hat{}(\frac{1}{2})$ where |G| is the size of the group), though the "forwards exponentiation" is still efficiently computable. Based on the (assumed) intractability of the discrete logarithm problem, Diffie-Hellman uses the following key agreement method. Let (G,*) be such a "hard" group and let g be a designated element of G. The protocol is as illustrated in FIG. 4 below for two terminals $UE_A$ and $UE_B$. (Note that by commutativity: $yB\hat{}xA=(g\hat{}xB)\hat{}xA=(g\hat{}xA)\hat{}xB=yA\hat{}xB$.) The result of the Diffie-Hellman exchange is a shared secret key k which provides a PMK.

In practice, for security reasons k may not be used directly to encrypt traffic, but rather some traffic encryption key (TEK) is derived from the PMK k (e.g. by taking a hash of the PMK). For complete security, $UE_A$ and $UE_B$ will need to authenticate one another, either by means of a previously known shared secret key, or by digital signatures and certificates.

By combining the use of a nonce exchanged between the network and a UE, and a Diffie-Hellman exchange, a secure mechanism for obtaining a shared secret key and which allows for lawful interception is obtained. This involves the sending of a nonce from the SDB to the initiating UE. Both the UE and the SDB apply the pseudo-random function to the nonce and the shared secret key to generate the value x. The UE generates an exponentiation of a value g to the power x, according to $g\hat{}x$, where g is a non-secret value known at least to the participating UEs and to the SDB. The computed value (a first cross-parameter) is sent to the responding UE. The responding UB receives a nonce from the SDB to which it is connected and uses this to generate a shared secret key y. It then computes $g\hat{}y$ (a second cross-parameter), and returns this to the initiating UE. Both parties now calculate a PMK according to $k\_m=g\hat{}(xy)$. During this process, a node such as the GGSN can intercept or "sniff" the value $g\hat{}y$ sent from the responding UE to the initiating UE. As long as the GGSN already knows the value of x (e.g. if given to if it from the SDB), it too can compute the PMK. This enables the GGSN to decrypt traffic. Again, in a preferred alternative, the GGSN simply forwards traffic to the intercept-centre, with the keys being forwarded separately to that centre, and the decryption is performed at the intercept centre.

Figure 5:
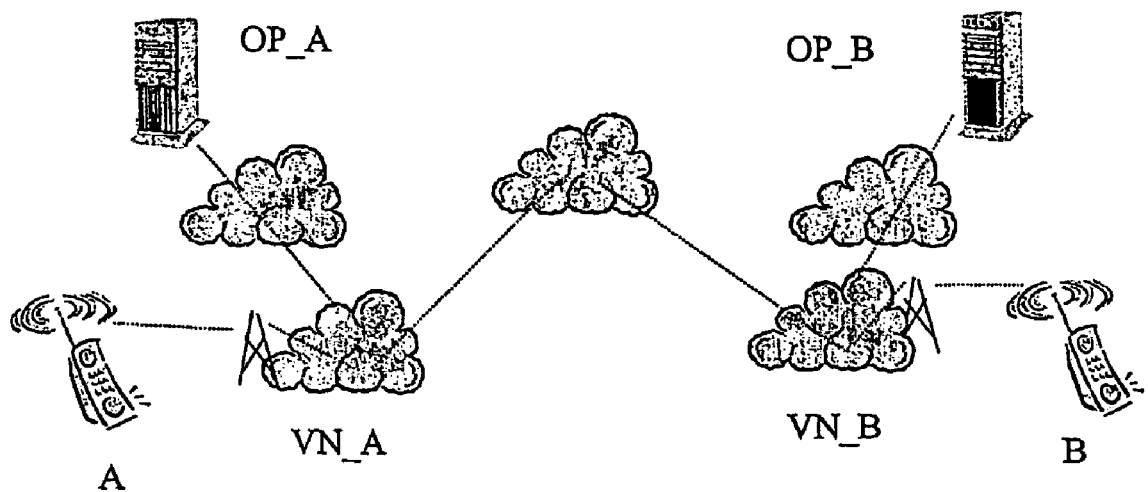
FIG. 5 illustrates a network structure where UEs are registered with visited networks.

In the case where a UE has roamed out of the coverage area of its home network (i.e. the network with which the UE has a subscription—see FIG. 5) into the coverage area of a visited network, it will be appreciated that the secret key k may be known only to the UE and to the home network. For security reasons, it is preferred that the key k does not become known to the visited network. However, the possibility for lawful interception within the visited network may still be a requirement. In this case, the nonce can be sent from the home network to the UE via the visited network. At the same time, the home network computes the PMK and sends this to the visited network. Thus, the visited network can decrypt traffic encrypted with the PMK (or a TEK derived from the PMK). In the case where a Diffie-Hellman exchange is used, the visited network is sent the value x by the home network, and can intercept the value $g\hat{}y$, thus allowing the visited network to compute the PMK $\{g\hat{}(xy)\}$.

The 3G (UMTS) cellular standard supports authentication and key-agreement between a mobile terminal (UE) and the network (the radio network controller (RNC) node). A part of the protocol, known as the authentication and key agreement (AKA) protocol, is used to establish a key to protect traffic in the link between the UE and the RNC. However, the prior art protocols do not consider using this key, or keys derived therefrom, to secure the traffic outside of this link. It is proposed here to use the key to secure the traffic end-to-end, i.e. from user terminal to user terminal.

AKA operates as follows. The mobile terminal UE and its home network share a secret key $k_i$ (stored on the UE's SIM card and in the operator's SDB, i.e. HSS or HLR/AuC). When the UE connects to a visited network, the visited network asks the home network for a "quintet" comprising five values. Only three of these values, rand, XRES, and $k_c$, are relevant here. The value rand is a random value generated by the home network. The value $k_c$ can be equated to the secret key x and is derived by applying a key derivation function KDF (typically a block cipher function using $k_i$ as key) to the secret key $k_i$ and the random value rand, i.e. $k_c$=KDF($k_i$, rand). XRES is derived by the home network as XRES=$f$(ki,rand), where the function $f$ is typically a publicly known function.

Figure 6:
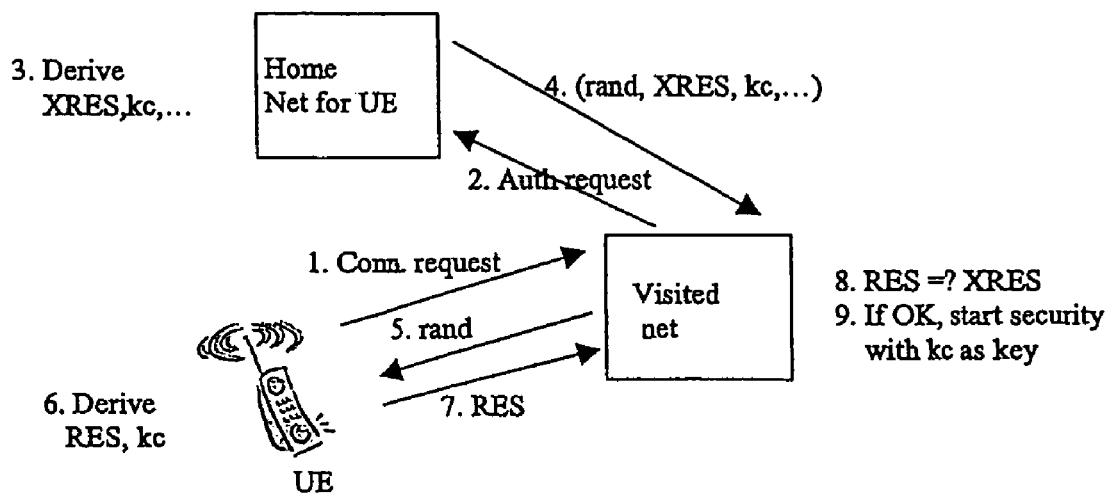
FIG. 6 illustrates an AKA protocol.
Figure 7:
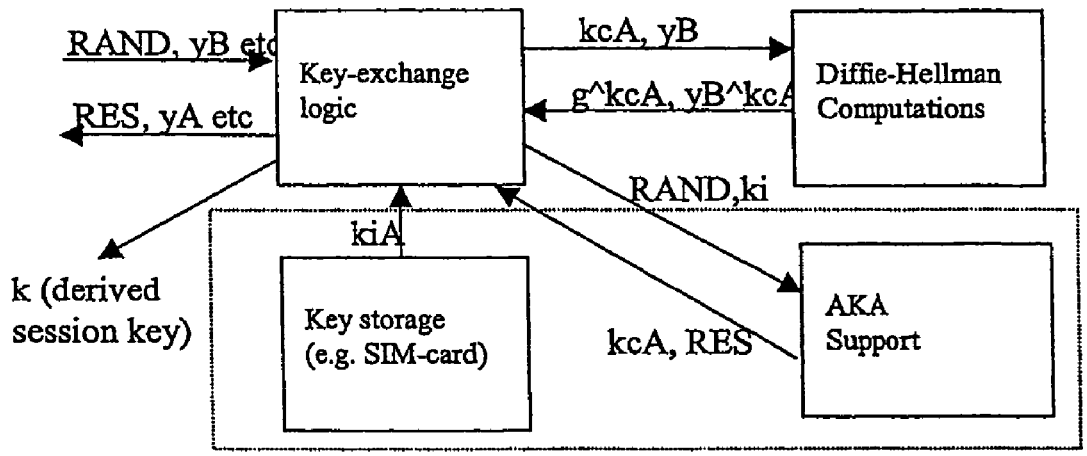
FIG. 7 illustrates modules of a UE associated with authentication and security.

The visited network forwards the value rand to the UE. The UB knows the functions $f$ and KDF and computes $k_c$ and a result RES. The value RES is returned to the visited network where it is compared with the value XRES. Assuming that XRES=RES, the UB is authenticated to the visited network. A similar procedure would be performed for some other mobile terminal, connected to a visited network, with which the first mentioned terminal wishes to communicate. Using a Diffie-Hellman exchange, the PMK becomes known to both terminals. As a visited network can sniff $g^{\wedge}k_{c(A\ or\ B)}$, it can derive the PMK $(g^{\wedge}(k_{c(A\ or\ B)}k_{c(B\ or\ A)})$. It is also possible for a visited network to verify that a terminal is using the agreed key $k_c$, and is not trying to cheat by using some other self-generated key. The AKA protocol is further illustrated in FIG. 6, whilst FIG. 7 illustrates the modules implemented in a UE to support the AKA and key exchange protocols (the dotted lines in FIG. 7 identify components which should be contained within a tamper resistant "module" for increased security.

The mechanism described in the preceding paragraph assumes that the visited network(s) is(are) trusted. If this is not the case, then a solution is to allow a mobile terminal to generate a key $k_c'$=KDF2($k_i$, rand), where KDF2 is another key derivation function but which is cryptogtraphically independent of KDF. Independence of KDF and KDF2 may be achieved either by using completely different functions or, if the first function is a block cipher KDF(k,r)=E(k,r), a simple transformation could be used to obtain the second function, e.g. KDF2=E(k XOR m,r) for some fixed bit-mask m. (Of course, other alternative solutions exist.) The two keys generated by the mobile terminals are used in the Diffie-Hellman exchange. As the visited networks do not know KDF2, they cannot derive the keys $k_c'_{(A\ and\ B)}$. If it is required to perform lawful interception at a visited network, then the secret key $k_c'$ of a terminal can be sent from the terminal's home network to the visited network. Lawful interception can be performed at the home network providing that the visited network first provides the sniffed value $g^{\wedge}k_c$ to the home network and that encrypted traffic is subsequently forwarded to the home network.

With this mechanism it is not possible for a visited network to confirm that a terminal is indeed using the agreed secret key $k_c'$. This is easily solved by allowing the visited networks to exchange the sniffed values $g^{\wedge}k_{c(A\ and\ B)}$, and comparing the values which were sent with the values which should have been sent. This still does not allow a visited network to intercept traffic without first having received the key $k_c'$ from the home network.

Still further modifications can be made to the embodiments described above, as will be appreciated by the person of skill in the art. For example, rather than Diffie-Hellman, MTI, station-to-station protocol, etc may be used to agree upon a PMK between the mobile terminals. Using multi-party variants of the key exchange protocols, it is possible to set up a secure teleconference between multiple terminals.

In the embodiments described above, it has been assumed that the secret key k and the pseudo-random function PRF are stored on the subscriber's SIM card. As SIM cards become more sophisticated, including some level of processing power, it is possible that the entire process of generating the PMK will be done on the SIM card. To further illustrate the invention, another embodiment will now be described. This embodiment employs the invention at the SIP (application) level and can for instance be used in the case of user-to-user IP multimedia traffic. The example is based on current 3GPP specifications, but is clearly not limited thereto. It is assumed that the UEs wishing to establish a secure session have already registered with respective visited networks to get network access. This would typically involve performing the AKA procedure between the UEs and respective GGSNs and home networks. A second AKA procedure, known as IMS AKA (see IETF RFC3310) is used to authenticate a UE at the SIP level. The invention takes advantage of the IMS AKA procedure to generate session keys in a way which does not introduce additional signalling load.

The Session Initiation Protocol (SIP) has been introduced above. However, a more detailed description may be helpful. This description uses the following abbreviations:

CSCF Call Server Control Function
CN Core Network
HTTP Hyper Text Transport Protocol
IMPI IMS Private Identity
IMS IP Multimedia Subsystem
SEG Security Gateway
SDP Session Description Protocol
SIP Session Initiation Protocol
SADB Security Association Database
SPD Security Policy Database
UAC User Agent Client
UAS User Agent Server SIP is a control protocol which can initiate, terminate and modify multimedia sessions and is specified in IETF RFC 2543 (1999) SIP: Session Initiation Protocol. Multimedia sessions include, e.g. voice calls, videoconferences, streaming and chat. It is common that the Session Description Protocol (SDP) {as described in IETF RFC 2327 (1998) SDP: Session description Protocol} is used in conjunction with SIP to specify the sessions and negotiate the codecs to be used. A user can be reachable at different IP-addresses, i.e. terminals, depending upon the registration process. In the registration process the user registers the identities and the corresponding IP addresses.

SIP is based on HTTP and works in a similar way, i.e. it is based on a client-server model. Hence an entity is either sending requests as a client or responses as a server. A SIP transaction has happened when the request has triggered a response and the client has received the response.

A number of different entities are in use when SIP is used. These are:

User Agent

The user agent interacts with the user, e.g. when the user invites (sets up) a voice call with another party. A user agent is either a client or a server depending on whether it originates requests or returning responses.

Proxy Servers

A proxy server can be Call Stateful, Transaction Stateful or Stateless. A stateless proxy does not store any states, i.e. it only forwards the request and from the Via header it can route a response. A call stateful proxy stores state parameters from the start of a session with an INVITE until that session ends. Such a proxy can measure the length of a call. Note that all subsequent SIP messages in a particular session will be routed through a Call Stateful Proxy. A Transaction Stateful Proxy, e.g. a Forking proxy, stores parameters that are only related to a particular transaction, i.e. until the transaction is ended.

Forking Proxy

A Forking Proxy is a SIP Proxy that can try different alternate locations for an INVITE message and this can be done in a sequential or parallel manner.

Redirect Servers

A redirect server may have information about different contact addresses where a particular user can be reached. If a caller tries the public address of a friend, then the UA of the caller will receive a number of different alternate addresses from the redirect server at which the friend can be located. The UA of the caller then can try all of these alternatives.

Registrars

A registrar accepts registrations, i.e SIP REGISTER. A SIP user can tell the Registrar, which address the user is reachable at.

There are six different "mechanisms" defined in SIP that can be included in requests

INVITE

An INVITE is sent from a user to other users or servers with which that user wants to set up a session, e.g. a videoconference or streaming.

ACK

SIP uses a three-way handshake for INVITEs. This is the only method which is three-way—all other methods are two way. This enables the use of forking proxies. Furthermore it also takes into account that for different reasons the invited party may consume take considerable time before actually accepting the invitation. The originating user sends an ACK when the invited user has accepted the call. At this point all involved parties have verified that the INVITE is still valid.

OPTIONS

OPTIONS is used for identifying the capabilities of a server, e.g. what methods it is supporting.

BYE

A BYE is sent for terminating a session.

CANCEL

A user may have sent an INVITE to another user. Before an ACK has been returned the user that sent an invitation might for different reasons terminate the transaction using a CANCEL.

REGISTER

A REGISTER is sent by the user towards a registrar in order to notify the server of the IP address at which a user can be reached.

Figure 8:
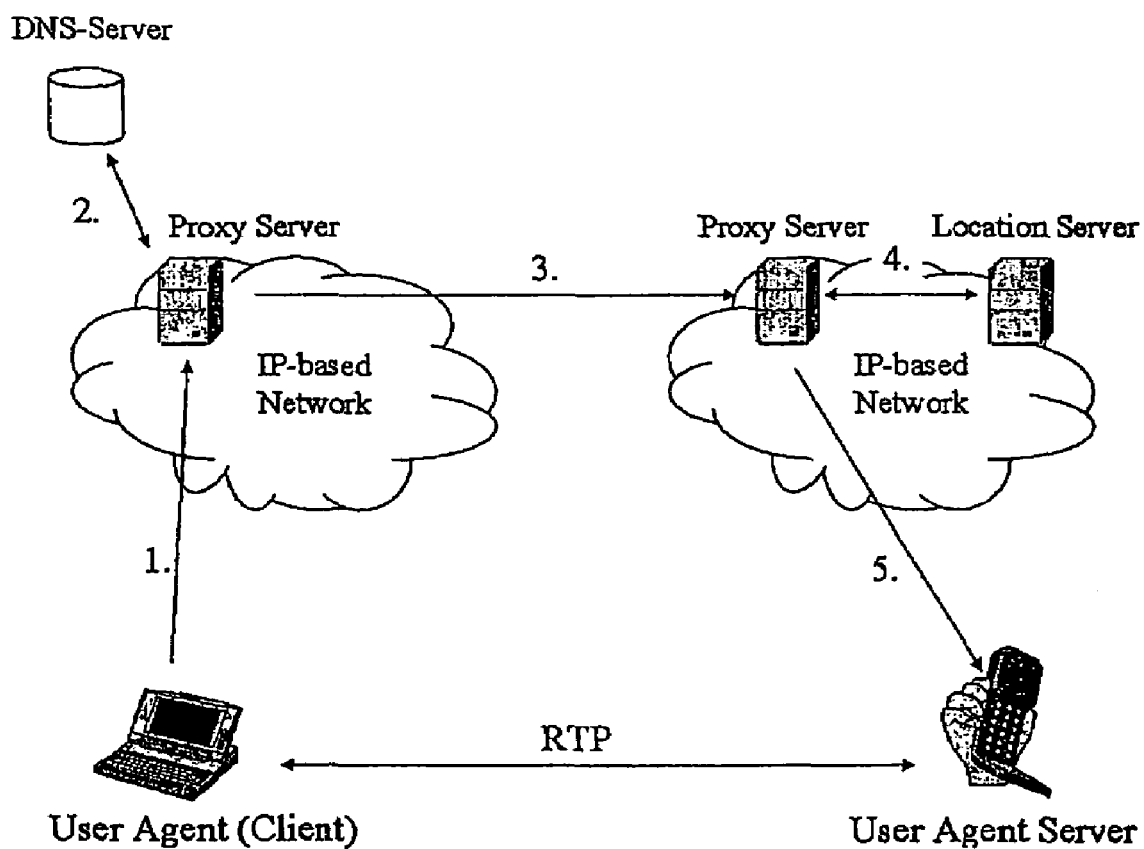
FIG. 8 illustrates the steps in setting up a SIP call.

The procedure for setting up a "call" using SIP is illustrated in FIG. 8. In this case the user agent, which is acting as a client or UAC, sends an INVITE to the UA of a friend that will act as a server or UAS. The UAC sends the SIP INVITE (1) towards a Proxy Server, which will communicate (2) with a DNS server in order to find out the address of the next hop. The Proxy Server forwards the SIP INVITE (3) and this time the Proxy Server needs to communicate (4) with a Location Server in order to find out the IP address of the receiving party and then forward the INVITE (5). The User Agent Server will send back response to the UAC, which in SIP has the syntax 180 RINGING. The UAC then knows that the message has been received by the UAS. In this situation the UAC may decide to terminate the call, e.g. because it took too long for the UAS to answer. In that case the UAC sends a SIP CANCEL to which the UAS responds with a SIP 200 OK. If the user decides to answer the call the UAS will send back a SIP 200 OK and the UAC will send a SIP ACK towards the UAS indicating that the call is still fresh. Note that packets can be lost and therefore the ACK mechanism is needed. This is the so-called three-way handshake. Now the session starts, e.g. by using RTP as specified in IETF RFC 1889 (1996) RTP: a transport protocol for real-time applications. (NB. The SIP protocol is undergoing some major changes, e.g. reflecting 3GPP requirements as can be found in IETF RFC 2543bis-09 (2002) SIP: Session Initiation Protocol.

The 3GPP IMS is a CN within UMTS and is based on SIP. There are four entities of interest in regards to SIP in IMS:

The UE (The user equipment)

Contains the UA

The P-CSCF

Acts as an outbound proxy. This is the first contact point for the UA in the UE located in the visited network. It forwards SIP requests towards the I-CSCF. Note: If the GGSN resides in the Home Network then the P-CSCF will also be in the Home Network.

The I-CSCF

This is the contact point in the home network and acts as a SIP proxy. It forwards SIP requests or responses towards a S-CSCF.

The S-CSCF

This may behave as a Registrar, a Proxy Server and a UA. Before the UE can send an INVITE it has to first register a public identity or an IMPU successfully. The registration of an IMPU is done by the UE sending a REGISTER towards the Home Network. The HN issues a challenge towards the UE. The identity that is authenticated is the private identity or the IMPI and the authentication is performed by the S-CSCF.

Figure 9:
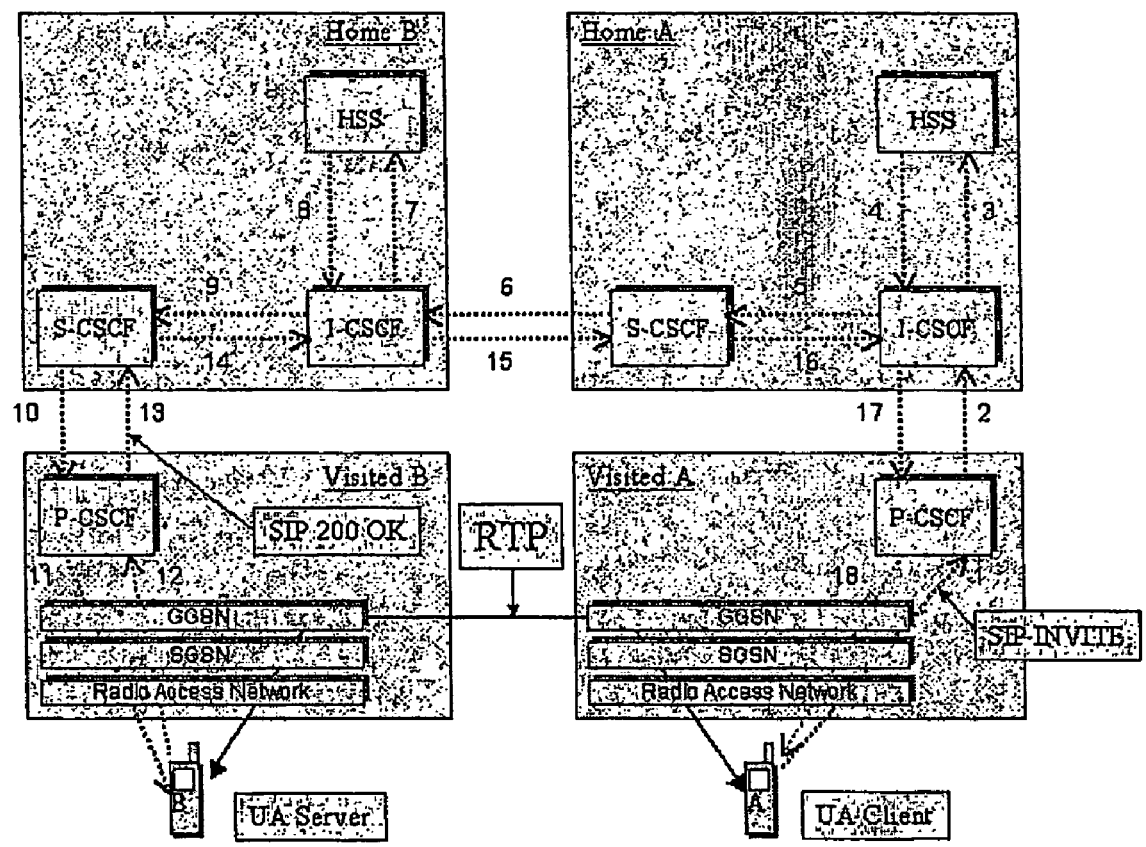
FIG. 9 illustrates in detail the steps in setting up a SIP call between two subscribers attached to different 3G networks.

FIG. 9 illustrates a scenario were an INVITE is sent from one UE to another UE, both UEs residing in a 3GPP network.

For the first and the last hop (between the UE and P-CSCF), IPsec ESP is used as specified in 3G TS 33.203: "$3^{rd}$ Generation Partnership Project (3GPP); Technical Specification Group (TSG) SA3; Access Security for IP-based services, (Release 5). (Note: this protection is for the SIP signalling, not for the actual user traffic.) Sensitive data will be exchanged between the Visited Network and the Home Network using the SIP protocol. It is therefore a requirement that inter-network SIP signalling is protected by a SEG.

Key Management

The session key for integrity protection is derived from the IMS AKA procedures. When the UE sends an unprotected REGISTER message, upon receiving this message the Home Network (HN), i.e. the S-CSCF, issues a challenge towards the UE. The SIP message containing the challenge includes the session key tailored to the P-CSCF whereas the UE derives the same session key from the challenge. This procedure is as described above and involves the sending of the rand, XRES, and $k_c$ parameters to the P-CSCF, and the forwarding of the rand parameter to the UE.

IKE

IKE is used for negotiating IPsec SAs for protecting SIP signalling between the visited network and the home network.

What is important to keep in mind is that only the SIP signalling goes through the IMS (the CSCF nodes), the actual user data payload will be carried over a protocol like RTP, sent over the normal GPRS (GGSN) network. Therefore, the key management (e.g. MIKEY) will typically be part of the SIP signalling in IMS, whereas the actual security (e.g. SRTP) is applied to packets sent over another path in the overall GPRS network.

With the above introduction on IP Multimedia call set-up, we now describe an exemplary way how the present invention can be used to perform interception of end-to-end protected (e.g. using SRTP) IP multimedia traffic compliant with 3GPP standards, without any changes to existing standards. For simplicity, we shall assume a Diffie-Hellman key agreement (e.g. using MIKEY) is used between the users, though it will be clear to those of skill in the art that the other methods previously described (using pre-shared or public keys) can be used as well with corresponding modifications.

As mentioned above, when a user A performs a SIP registration, he will derive a key, k, for protecting the SIP signalling between him/her and the P-CSCF in the visited network. Using k, keying material x can be derived (e.g. setting x=k in the simplest form). User A now uses $g^x$ for his Diffie-Hellman value sent (e.g. by MIKEY as part of a SIP/SDP message) to user B on call set-up. Similarly, user B obtains key y, and sends $g^y$ back in the similar way. The respective networks can now, using the known exponent x (or y), and the "sniffed" $g^y$ (or $g^x$) perform lawful interception by forwarding corresponding keying material (e.g. x from the P-CSCF and $g^y$ from the GGSN) to the interception point, and then forwarding the actual traffic (encrypted) from the GGSN node it passes to the interception point. Note that if the invention is used with 3GPP IMS specifications, no existing, standardised communication interface needs to be changed.

Of course, all the previously mentioned extensions, e.g. using a second level of key-derivation, KDF2, to only allow the Home Network to perform interception is applicable here too, as can be easily seen by those of skill in the art.

The invention claimed is:

1. A method of facilitating the lawful interception of a data session between two or more terminals, wherein said session uses encryption to secure traffic, the method comprising:

storing a key allocated to at least one of said two or more terminals, at the at least one terminal and at a node within a network through which said session is conducted or at a node coupled to that network;

prior to the communication of a session setup request from a calling terminal to a called terminal, exchanging a seed value between the at least one terminal and said node;

using the key and the seed value at the at least one terminal to generate a pre-master key, the pre-master key subsequently becoming known to each other terminal involved in the data session and using a key exchange procedure to transmit a first cross-parameter from the said at least one terminal to another terminal and to transmit a second cross-parameter from the other terminal to the said at least one terminal; and directly or indirectly using said pre-master key to encrypt and decrypt traffic associated with said session.

2. The method of claim 1, wherein said node generates the pre-master key for use in lawful interception of the data session.

3. The method of claim 1, wherein said key exchange procedure is a Diffie-Hellman exchange.

4. The method of claim 3 further comprising detecting at said node, or at another node through which session traffic passes, the exponentiation of a second key sent to the at least one terminal from a peer terminal during the Diffie-Hellman exchange, and generating the pre-master key using detected exponentiated second key and the second key of the said at least one terminal.

5. The method of claim 1, further comprising applying a key derivation function to said key and the seed value to derive an exponentiation of the second key then being generated for use in the Diffie-Hellman exchange.

6. The method of claim 1, wherein the steps of exchanging the seed value between the terminal and the network node, and of generating the pre-master key are carried out each time a new data session is to be established.

7. The method of claim 1, wherein the steps of exchanging the seed value between the terminal and the network node, and of generating the pre-master key are carried out for every data session regardless of whether or not lawful interception is required.

8. The method of claim 1 wherein the pre-master key is used by the terminals involved in the data session to generate one or more traffic encryption keys, the traffic encryption keys being used to encrypt the traffic associated with the data session.

9. The method of claim 1, wherein said node is a node of the home network with which the user of said at least one terminal has a subscription.

10. The method of claim 1, wherein said at least one terminal is attached to a foreign network, and the seed value is sent to the terminal via the foreign network.

11. The method of claim 1, further comprising generating the second key at said node of the home network, sending the key to the foreign network together with the seed value, and sending the seed value but not said second key to the terminal.

12. The method of claim 1, wherein said data session is an IP data session.

13. A method of facilitating the lawful interception of a data session between two or more terminals, wherein said session uses encryption to secure traffic and at least one of the terminals is a mobile wireless device, the method comprising:

storing a first key allocated to said at least one terminal, at the at least one terminal and at a node within the at least one terminal's home network;

using the first key to authenticate the at least one terminal when the at least one terminal registers with the home network or a visited network;

using the first key and a seed value sent from the home network to the at least one terminal to encrypt traffic end-to-end during said data session;

generating a second key at the mobile terminal using the seed value and the first key; and performing a Diffie-Hellman exchange using said second key.

14. The method of claim 13, wherein said step of using the key to authenticate the terminal uses the authentication and key agreement (AKA), protocol, this protocol also making use of the key to secure data sent over a radio link.

15. The method of claim 13, wherein said step of using the key to authenticate the terminal comprises using the key to generate a challenge value at said node and a response value at the terminal, comparing the challenge and response values, and authenticating the terminal only if the values match.

16. The method of claim 13 comprising sending the key and the seed value to a lawful interception authority, wherein user traffic to be intercepted is forwarded to the lawful interception authority from the access network, and the authority can use the received key and seed value to decrypt the forwarded traffic.

17. The method of claim 16, further comprising sniffing one or more parameters associated with a key exchange protocol between said terminals in the access network, and forwarding these to the lawful interception authority with said key and seed value.

18. A method of securing data transmitted between a plurality of terminals, each of which is attached to a communications network, at least one of the terminals having allocated to it a home network, the method comprising:

sending a seed value from the home network to the at least one terminal, via the corresponding communications network, as part of a call signalling level authentication procedure; and using said seed value at the at least one terminal to generate one or more traffic encryption keys for use in the end-to-end encryption of traffic associated with a call between terminals; and forwarding said seed value to a lawful interception authority to allow that authority to compute the traffic decryption keys, whereby when a call is setup encrypted traffic can be forwarded to the authority for decryption.

19. The method of claim 18, wherein said at least one terminal is a mobile wireless terminal attached to a mobile communications network.

20. The method of claim 18, comprising storing a secret key at said at least one terminal and in the home network, and sending that key or a key derived therefrom from the home network to said communication network for use in said authentication procedure, the sent key also being used by the wireless terminal to generate said traffic encryption keys.

21. The method of claim 18, wherein the step of generating one or more traffic encryption keys comprises performing a key exchange procedure between the terminals.

22. The method of claim 18, wherein Session Initiation Protocol is used to setup and control calls between terminals.

23. The method of claim 18, further comprising sending said seed value from a S-CSCF node of said home network to the at least one terminal, via a P-CSCF node of said communication network.

24. The method of claim 18, wherein said call signaling level authentication procedure is an IMS AKA procedure.

25. A method of communicating data between a first terminal and a second terminal on an end-to-end security basis, the first terminal being served by a first network, and the second terminal being served by a second network, the method comprising:

a first authentication and key agreement sub-procedure involving transmitting a first set of values from the first terminal's designated home operator to the first network and on the basis thereof deriving at least one first encryption parameter to be used by the first terminal;

a second authentication and key agreement sub-procedure involving transmitting a second set of values from the second terminal's designated home operator to the second network and on the basis thereof deriving at least one second encryption parameter to be used by the second terminal;

a key exchange sub-procedure involving transmitting a first cross-parameter from the first terminal to the second terminal and transmitting a second cross-parameter from the second terminal to the first terminal, and a communication phase where the first terminal and the second terminal exchange information via a connection being end-to-end encrypted in the first terminal on the basis of the at least one first encryption parameter and the second cross-parameter, and in the second terminal on the basis of the at least one second encryption parameter and the first cross-parameter.

26. The method of communicating data according to claim 25, comprising intercepting the information exchange between the first terminal and the second terminal in at least one of the first network, based on the first encryption parameter and the second cross-parameter, and the second network, based on the second encryption parameter and the first cross-parameter.

27. A first terminal for communicating data with at least one other terminal on an end-to-end security basis, the first terminal being served by a first network, the at least one other terminal being served by a second network, the first terminal comprising:

a first encryption unit, adapted to request a first set of values from the first terminal's designated home operator and receive at least one first encryption parameter;

a memory for storing a key allocated to at least one of said terminals, at the first terminal and at a node within a network through which said session is conducted or at a node coupled to the network;

means for exchanging a seed value between the first terminal at which the key is stored and said node prior to the communication of a session setup request from the first terminal to the at least one other terminal;

means for generating a pre-master key using the key and the seed value at the terminal, wherein the pre-master key subsequently also becomes known to each other terminal involved in the data session;

means for using the pre-master key to directly or indirectly decrypt data at the node within the network or at another node to which the pre-master key is sent;

a key exchange unit, adapted to transmit a first cross-parameter to the at least one other terminal and receive a second cross-parameter from the at least one other terminal; and a data transceiver for exchanging information with the at least one other terminal via a connection being end-to-end encrypted on the basis of the at least one first encryption parameter and the second cross-parameter.

28. A method of facilitating the lawful interception of a data session between two or more terminals, wherein said session uses encryption to secure traffic, the method comprising:

storing a key allocated to at least one of said terminals, at the terminal and at a node within a network through which said session is conducted or at a node coupled to that network;

prior to the communication of a session setup request from a calling terminal to a called terminal exchanging a seed value between the terminal at which the key is stored and said node;

using the key and the seed value at the terminal to generate a pre-master key, wherein the pre-master key subsequently also becomes known to each other terminal involved in the data session;

generating the pre-master key at said node and using the pre-master key to directly or indirectly decrypt data at that node or at another node to which the pre-master key is sent:

directly or indirectly using said pre-master key to encrypt and decrypt traffic associated with said session; and using a key exchange procedure to transmit a first cross-parameter from the said at least one terminal to another terminal and to transmit a second cross-parameter from the other terminal to the said at least one terminal.

29. The method of claim 28, wherein said node generates the pre-master key for use in lawful interception of the data session.

30. The method of claim 28, wherein said key exchange procedure is a Diffie-Hellman exchange.

31. The method of claim 30, further comprising applying a key derivation function to said key and the seed value to derive a second key, an exponentiation of the second key then being generated for use in the Diffie-Hellman exchange.

32. The method of claim 28, wherein the steps of exchanging the seed value between the terminal and the network node, and of generating the pre-master key are carried out each time a new data session is to be established.

33. The method of claim 28, wherein the steps of exchanging the seed value between the terminal and the network node and of generating the pre-master key are carried out for every data session regardless of whether or not lawful interception is required.

34. The method of claim 28, wherein the pre-master key is used by the terminals involved in the data session to generate one or more traffic encryption keys, the one or more traffic encryption keys being used to encrypt the traffic associated with the data session.

35. The method of claim 28, wherein said node is a node of the home network with which the user of said at least one terminal has a subscription.

36. The method of claim 28, wherein said at least one terminal is attached to a foreign network, and the seed value is sent to the terminal via the foreign network.

37. The method of claim 36 further comprising, generating the second key at said node of the home network, sending the key to the foreign network together with the seed value, and sending the seed value but not said second key to the terminal.

38. The method of claim 28, wherein said data session is an IP data session.

* * * * *